(12) United States Patent
Kim et al.

(10) Patent No.: US 10,568,038 B2
(45) Date of Patent: Feb. 18, 2020

(54) METHOD AND DEVICE FOR ADJUSTING TRANSMIT POWER IN WIRELESS COMMUNICATION SYSTEM

(71) Applicant: Samsung Electronics Co., Ltd., Suwon-si, Gyeonggi-do (KR)

(72) Inventors: Jongkyung Kim, Suwon-si (KR); Byoungha Yi, Suwon-si (KR); Dongheon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/242,442

(22) Filed: Jan. 8, 2019

(65) Prior Publication Data

US 2019/0215776 A1 Jul. 11, 2019

(30) Foreign Application Priority Data

Jan. 9, 2018 (KR) .................. 10-2018-0002798

(51) Int. Cl.
*H04W 52/10* (2009.01)
*H04W 52/14* (2009.01)
*H04W 52/24* (2009.01)
*H04W 52/36* (2009.01)

(52) U.S. Cl.
CPC ......... *H04W 52/143* (2013.01); *H04W 52/10* (2013.01); *H04W 52/241* (2013.01); *H04W 52/243* (2013.01); *H04W 52/367* (2013.01)

(58) Field of Classification Search
CPC .. H04B 17/373; H04W 52/10; H04W 52/143; H04W 52/243; H04W 52/241; H04W 52/367; H04W 76/14
See application file for complete search history.

(56) References Cited

U.S. PATENT DOCUMENTS

| 2011/0199945 | A1* | 8/2011 | Chang | H04W 52/146 370/281 |
|---|---|---|---|---|
| 2011/0317574 | A1 | 12/2011 | Richardson | |
| 2015/0094114 | A1 | 4/2015 | Rao et al. | |
| 2016/0242129 | A1 | 8/2016 | Tachikawa | |
| 2016/0286450 | A1* | 9/2016 | Badic | H04W 76/14 |

FOREIGN PATENT DOCUMENTS

| EP | 2 991 413 A1 | 3/2016 |
|---|---|---|
| EP | 3 169 115 A1 | 5/2017 |
| KR | 10-2018-0127842 A | 11/2018 |

OTHER PUBLICATIONS

European Search report dated May 3, 2019, issued in the European application No. 19150893.6.

\* cited by examiner

*Primary Examiner* — Thanh C Le
(74) *Attorney, Agent, or Firm* — Jefferson IP Law, LLP (57) ABSTRACT

A method for adjusting transmit power of a serving base station in a wireless communication system is provided. The method includes receiving measurement information indicating channel states of the serving base station and at least one neighbor base station from at least one serving user equipment (UE), receiving first information including information about transmit power of the at least one neighbor base station from the at least one neighbor base station, and determining the transmit power of the serving base station using the measurement information and the first information.

17 Claims, 6 Drawing Sheets

METHOD AND DEVICE FOR ADJUSTING TRANSMIT POWER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0002798, filed on Jan. 9, 2018, in the Korean Intellectual Property Office, the disclosure of which is incorporated by reference herein in its entirety.

BACKGROUND

1. Field

The disclosure relates to methods and devices for adjusting transmit power in wireless communication systems. More particularly, the disclosure relates to a method and device for adjusting transmit power in a real-time, distributive manner to enhance the signal-to-interference plus noise ratio (SINR) of a user equipment (UE) in an inter-cell interference environment.

2. Description of Related Art

In order to meet the demand for wireless data traffic soaring since fourth generation (4G) communication systems came to the market, there have been ongoing efforts to develop enhanced fifth generation (5G) communication systems or pre-5G communication systems. For this reason, 5G communication systems or pre-5G communication system is called the beyond 4G network communication system or post long term evolution (LTE) system.

For higher data transmit rates, 5G communication systems are implemented on ultra high frequency bands millimeter wave (mmWave), such as, e.g., 60 GHz. To mitigate path loss on ultra high frequency bands and to increase the reach of radio waves, the following techniques are taken into account for 5G communication systems, beamforming, massive multi-input multi-output (MIMO), full dimensional MIMO (FD-MIMO), array antennas, analog beamforming, and large scale antennas.

Various technologies for enhancing the network of 5G communication systems are also being developed are, such as evolved or advanced small cells, cloud radio access networks (cloud RAN), ultra-dense networks, device-to-device (D2D) communication, wireless backhaul, moving networks, cooperative communication, coordinated multi-point (CoMP), and interference cancellation.

There are also other various schemes under development for 5G systems including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

In mobile communication systems, homogeneous base stations generally transmit data in the same transmit power. However, actual data traffic distribution is uneven and varies over time. User equipment (UE), while moving in the mobile communication network, experiences varying radio frequency (RF) characteristics. Therefore, a need exists for enhancing the performance of mobile communication networks by adjusting the transmit power of base stations based on real-time RF distribution and RF state the UE experiences.

Common wireless communication systems adjust transmit power on a long-term basis using statistical information about network loading and measurement information gathered for a predetermined time. However, such long-term transmit power adjustment, although adequate for coverage optimization, is inapplicable when channel state and network loading are varied in real-time as the UE moves.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for adjusting transmit power in a real-time, distributive manner to enhance the signal-to-interference plus noise ratio (SINR) of a user equipment (UE) in an inter-cell interference environment. Hence, the cell (or base station) is required to predict inter-cell interference and resultant system performance in real-time and determine a proper transmit power for channel state and network load based on the results of the prediction.

Another aspect of the disclosure is to provide a method and device for adjusting the transmit power of a cell in a real-time, distributive manner to adjust inter-cell interference in an inter-cell interference environment.

Another aspect of the disclosure is to provide a method and device for detecting deterioration of network quality due to transmit power adjustment by monitoring network quality based on network statistics and updating the transmit power adjustment range.

Another aspect of the disclosure is to provide a method and device for predicting the SINR due to a variation in transmit power and updating the transmit power adjustment range to prevent the SINR of UE from lowering below the SINR at which communication outage occurs.

Another aspect of the disclosure is to provide a method and device for recognizing the occurrence of an excessive cell overlapping area and posing an upper limit on transmit power to remove such an excessive overlapping area.

Additional aspects will be set forth in part in the description which follows and, in part, will be apparent from the description, or may be learned by practice of the presented embodiments.

In accordance with an aspect of the disclosure, a method for adjusting transmit power of a serving base station is provided. The method includes receiving measurement information indicating channel states of the serving base station and at least one neighbor base station from at least one serving user equipment (UE), receiving first information including information about transmit power of the at least one neighbor base station from the at least one neighbor base station, and determining the transmit power of the serving base station using the measurement information and the first information.

In accordance with another aspect of the disclosure, a method for adjusting the transmit power of the serving base station is provided. The method includes at least one of adjusting a lower limit of the transmit power of the serving base station or adjusting an upper limit of the transmit power of the serving base station.

In accordance with another aspect of the disclosure, a serving base station configured to transmit power in a wireless communication system is provided. The serving base station includes a transceiver, and a processor configured to control the transceiver, wherein the processor is configured to receive measurement information indicating channel states of the serving base station and at least one neighbor base station from at least one serving UE, receive first information including information about transmit power of the at least one neighbor base station from the at least one neighbor base station, and determine the transmit power of the serving base station using the measurement information and the first information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an embodiment of the disclosure, there is proposed a scheme for adjusting transmit power in a real-time, distributive manner to adjust inter-cell interference in an inter-cell interference environment.

Figure 1:
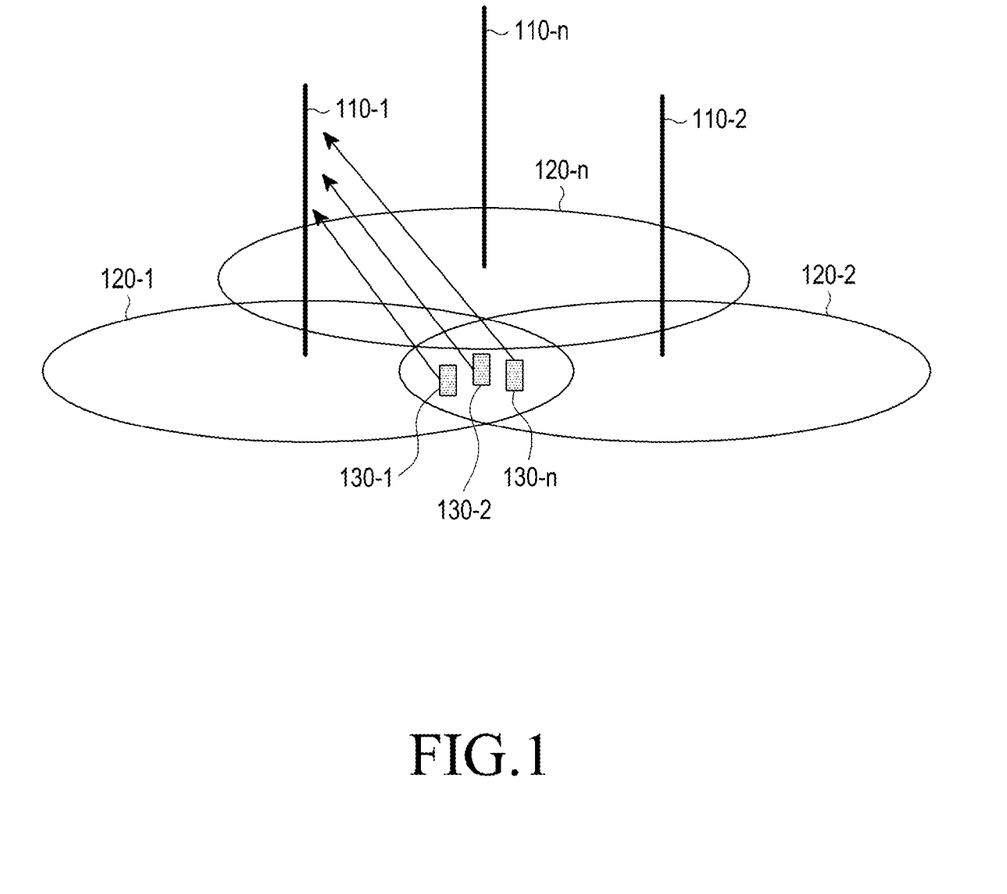
FIG. 1 is a view illustrating inter-cell interference among a plurality of base stations in a wireless communication system according to an embodiment of the disclosure.

FIG. 1 is a view illustrating inter-cell interference among a plurality of base stations in a wireless communication system according to an embodiment of the disclosure.

According to an embodiment of the disclosure, a wireless communication system includes a plurality of base stations and a plurality of user equipment (UEs).

As used herein, the term "base station' may be used interchangeably with the term "access point (AP)," "evolved node B (eNodeB)," or "eNB."

As used herein, the term "user equipment (UE)" may be used interchangeably with the term "mobile station," "subscriber station," "remote terminal," "wireless terminal," "terminal," or "user device." The UEs may be fixed or mobile and be cellular phones or personal computer devices. The UEs, whether mobile devices (e.g., mobile phones or smartphones) or stationary devices (e.g., desktop computers or vending machines), may be remote wireless equipment that may wirelessly access the base stations.

Referring to FIG. 1, as an example, the plurality of base stations may include a first base station 110-1, a second base station 110-2, . . . , and an nth base station 110-n. Each base station has a cell corresponding to its coverage. The first base station, the second base station, . . . , and the nth base station, respectively, may have a first cell 120-1, a second cell 120-2, . . . , and an nth cell 120-n. The plurality of UEs may include a first UE 130-1, a second UE 130-2, . . . , and an nth UE 130-n.

When the first UE 130-1 connects and communicates data with the first base station 110-1, the first base station is referred to as a serving base station for the first UE, the first cell as a serving cell for the first UE, and the first UE as a serving UE for the first base station. Referring to FIG. 1, the first UE 130-1, the second UE 130-2, . . . , and the nth UE 130-n are shown as serving UEs for the first base station, which is the serving base station.

Base stations located adjacent to the first base station 110-1 to interfere with the first cell 120-1 are referred to as neighbor base stations (or interfering base stations). FIG. 1 shows the second base station 110-2n, . . . , and the nth base station 110-n as neighbor base stations, and the second cell 120-2, . . . , and the nth cell 120-n as neighbor cells (or interfering cells).

The cell of each base station may mean the coverage of the base station for UEs, and the cell may be resized depending on the transmit power of the base station. As the transmit power of the base station increases, the cell enlarges, causing more interference with its neighbor cells. Conversely, when the transmit power of the base station decreases, the cell shrinks, causing less interference with its neighbor cell. Hence, inter-cell interference may be adjusted by adjusting the transmit power of the base station in such an inter-cell interference environment.

According to an embodiment of the disclosure, a method for adjusting transmit power may be performed by any base station. For illustration purposes, described here is a method for adjusting the transmit power of the first base station 110-1, which is the serving base station. The method for adjusting the transmit power of the first base station may also apply to the other base stations.

Figure 2:
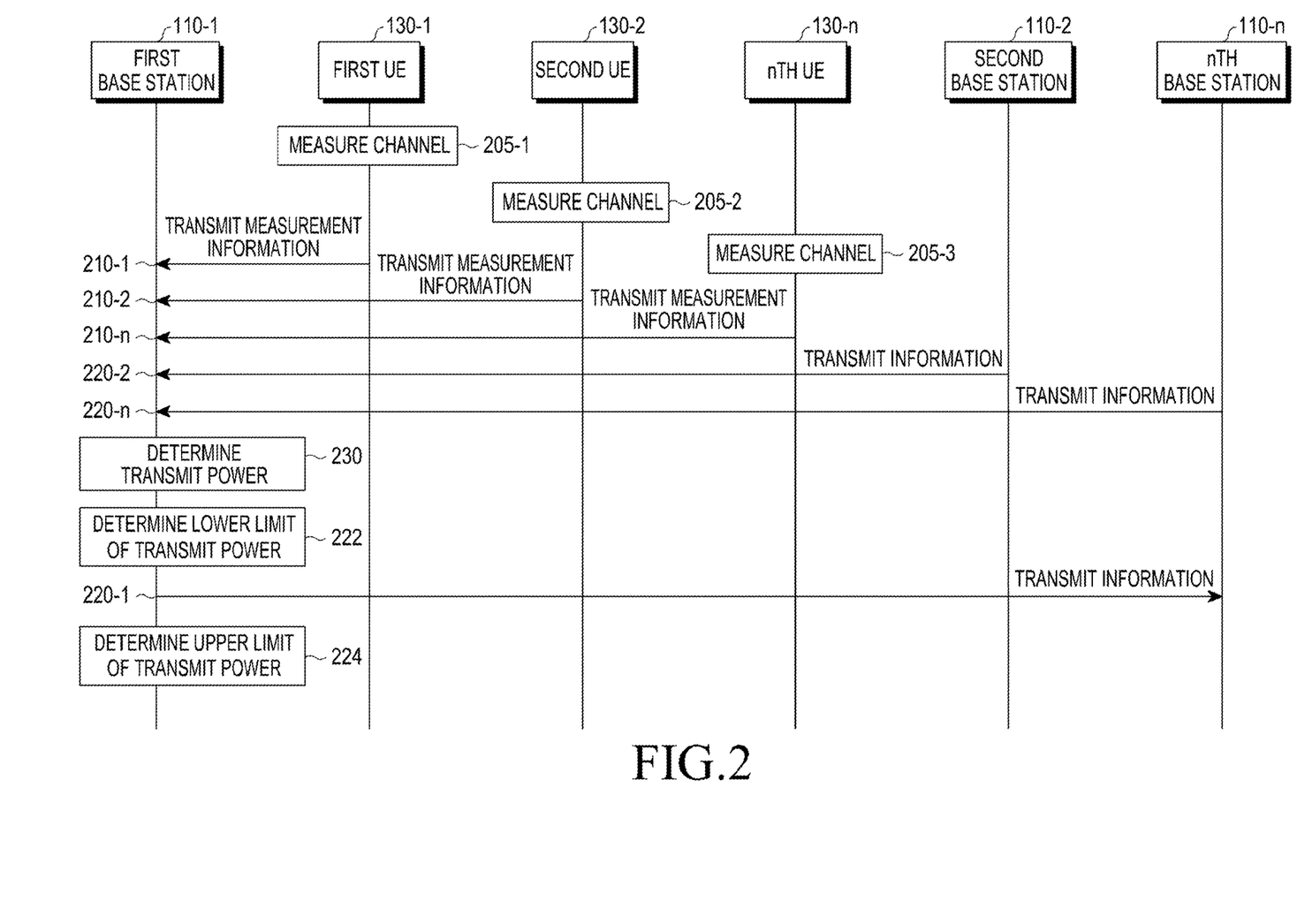
FIG. 2 is a flowchart illustrating a method for adjusting transmit power of a serving base station according to an embodiment of the disclosure.

FIG. 2 is a flowchart illustrating a method for adjusting transmit power of a serving base station according to an embodiment of the disclosure.

A method for determining the transmit power of the first base station 110-1, which is the serving base station, is described with reference to FIG. 2.

Referring to FIG. 2, in operation 210-1, the first base station 110-1 receives, from the first UE 130-1, measurement information that indicates the channel state of the first base station 110-1 and at least one neighbor base station 110-2 or 110-n.

The first UE 130-1 is a UE that is being served by the first base station 110-1.

The at least one neighbor base station includes at least one among the second base station 110-2, ..., and the nth base station 110-n, meaning neighbor base stations interfering with the first cell of the first base station 110-1.

The first UE 130-1 may measure the strength of signals received from the neighbor base stations, i.e., second base station 110-2, ..., and the neighbor base station 110-n, as well as the first base station 110-1.

The results of the measurement of the received signals (e.g., measurement report (MR) or measurement results) may be reference signal received power (RSRP). RSRP means the power of the signal received by the UE from the base station. When a high RSRP cell is the serving cell, this means that the channel state is good. However, when a high RSRP cell is a neighbor cell, the neighbor cell may cause large interference with the serving cell.

In operation 210-2, the first base station 110-1 receives, from the second UE 130-2, measurement information that indicates the channel state of the first base station and at least one neighbor base station. The second UE 130-2 is a UE being served by the first base station. The at least one neighbor base station includes the second base station 110-2, ..., and the nth base station 110-n, meaning neighbor base stations interfering with the first cell of the first base station.

When n serving UEs are being served in the first cell of the first base station, each UE measures the channel state of each base station and sends the channel information to the first base station 110-1.

In operations 220-2, ..., and 220-n, the first base station 110-1 receives first information from at least one neighbor base station. The at least one neighbor base station may be base stations interfering with the first cell of the first base station, which may be at least one of the second base station 110-2, ..., and the nth base station 110-n. In operation 220-1, the first base station 110-1 may send second information to at least one neighbor base station.

Each base station needs to exchange the first information or second information about the cell with another base station. Inter-base station cell information exchange may be performed via an interface (e.g., X2 interface) directly connected between base stations or via at least one other entity and several interfaces.

The exchange of the first information or second information about the cell between base stations may be performed at each information exchange cycle between neighbor cells. The first information may include at least one of information about the current transmit power of the base station sending out the first information, e.g., the second base station, information related to the signal-to-interference plus noise ratio (SINR) of the serving UE of the base station sending out the first information, information regarding a request for posing an upper limit on the transmit power of the neighbor base station (e.g., the first base station), or information regarding the usage (loading) of the cell of the base station sending out the first information. The second information may include at least one of information about the current transmit power of the base station sending out the second information, e.g., the first base station, information related to the SINR of the serving UE of the base station sending out the second information, information regarding a request for posing an upper limit on the transmit power of the neighbor base station (e.g., the second base station), or information regarding the usage (loading) of the cell of the base station sending out the second information.

In other words, taking operation 220-2 as an example, the first information may include at least one of information about the current transmit power of the second base station, information related to the SINR of the serving UE of the second base station, information regarding a request for posing an upper limit on the transmit power of the first base station or the nth base station, or information about the loading of the second base station.

In operation 230, the first base station 110-1 may determine the transmit power of the first base station.

Specifically, in order to determine the transmit power of the first base station, the first base station 110-1 calculates the received SINR of the serving UE using the first information received from the neighbor base station and measurement information received from the UE.

For the first UE in the first cell of the first base station, signals (e.g., signals received from neighbor base stations) other than the signal received from the first base station may serve as interference signals. Since the second base station, which is a neighbor base station of the first base station, causes interference with the first UE, the signal from the second base station may be used as the interference signal upon calculating the SINR of the first UE. When there is one neighbor base station (e.g., the second base station) for the first base station, the SINR of the first UE may be calculated using Equation 1.

$$\text{SINR\_dB}(1, P_1) = \frac{\text{signal}}{\text{interference} + \text{noise}} = 10 * \log 10\left(\frac{P\_1 * R\_1}{P\_2 * R\_2 * L\_2 + N}\right) \quad \text{Equation 1}$$

In Equation 1, SINR_dB(1,P_1) is the SINR (dB) of the first UE, which is the serving UE, when the transmit power of the first base station is set to P_1. P_1 is the current transmit power of the first base station, and P_2 is the current transmit power of the second base station, which is delivered in the first information to the first base station. L_2 is the current loading of the second base station, which is delivered in the first information to the first base station.

R_1 is the link gain between the first base station and the first UE by the received signal strength indication (RSSI) of the first base station measured by the first UE, and R_2 is the link gain between the second base station and the first UE by the RSSI of the second base station measured by the first UE. R_1 and R_2 are delivered in the measurement information (MR) from the first UE to the first base station. N is the noise of the first UE.

The RSRP measured by the UE reflects the power that the base station is using. Link gain means a gain between the base station and the UE except for the power the base station is currently using in the RSRP measured by the UE.

The interference term in Equation 1 increases when there are several neighbor base stations. For example, when there are j neighbor base stations, the interference term may be replaced with $$\sum_j P\_j * R\_j * L\_j.$$

When two or more serving UEs are present in the first cell of the first base station, the sum of SINRs of the set of the plurality of UEs may be represented as shown in Equation 2.

$$\text{SINR\_serving} = \sum_{m \in ConnectedUR} \text{SINR\_dB}(m, p) \quad \text{Equation 2}$$

SINR_dB(m,p) means the SINR (dB) of the mth serving UE when the transmit power of the first base station is set to p, and Connected UE means the set of serving UEs in the first cell of the first base station. SINR_serving refers to the sum of SINRs of the plurality of serving UEs in the first cell of the first base station.

Meanwhile, the at least one neighbor base station calculates the SINRs of the serving UEs being serviced in the cell of the neighbor base station in the same manner that the first base station does. The neighbor base station may include the SINR_neighbor value related to the first base station among the calculated SINRs in the first information at each inter-neighbor cell information exchange cycle and transmit the same to the first base station.

The first base station may obtain the SINR_serving value related thereto and the SINR_neighbor value related to the neighbor base station at each information exchange cycle. The first base station determines the transmit power using the SINR_serving value and the SINR_neighbor value. According to an embodiment of the disclosure, the transmit power (TxPower_current) is determined to maximize the sum of SINR_serving and SINR_neighbor (refer to Equation 3).

Referring to Equation 3, SINR_dB(m, p) corresponds to SINR_serving, and neighbor_metric(j,p) corresponds to SINR_neighbor.

According to the disclosure, transmit power may be adjusted to minimize influences by interference with the wireless communication system including a base station and neighbor base stations considering all of the SINRs of the base station and the SINRs of the neighbor base stations to determine the transmit of the base station.

$$TxPower_{current} = \underset{p}{\text{argmax}} \left( \sum_{m \in ConnectedUE} \text{SINR\_dB}(m, p) + \sum_{j \in NeighborCell} \text{neighbor\_metric}(j, p) \right) \quad \text{Equation 3}$$

where $p = \{p | TxPower_{LowerLimit} \leq p \leq TxPower_{UpperLimit},$
$\forall p \in \text{integer}\}$ SINR_dB(m,p) means the SINR (dB) of the mth serving UE, the serving UE, when the transmit power of the serving base station is set to p, and Connected UE means the set of serving UEs in the serving cell. Neighbor metric(j,p) is SINR metric (dB) of neighbor cell j when the transmit power of the first base station is set to p, and NeighborCell is a set of neighbor cells.

The transmit power of the first base station may be determined between the lower limit of transmit power (TxPowerLowerLimit) and the upper limit of transmit power (TxPowerUpperLimit). The lower limit and upper limit of transmit power are described below.

A method for determining SINR_dB(m,p) in the first base station and neighbor_metric(j,p) of the neighbor base station is described in a scenario case in which the first UE, second UE, . . . , and the nth UE are served in the first cell of the first base station.

In operation 205-1, the first UE 130-1 measures the channel state of the first base station 110-1 and at least one neighbor base station 110-2 or 110-n. The first base station 110-1 may receive first measurement information from the first UE 130-1 in operation 210-1.

For example, the first measurement information may include −100 dBm(: first base station), −103 dBm(: second base station), −105 dBm(: fourth base station), −108 dBm(: sixth base station), and −109 dBm(: eighth base station) which are the respective RSRPs of signals received from the first base station, which is the serving base station, and the second base station, the fourth base station, the sixth base station, and the eighth base station, which are the neighbor base stations.

The first base station may determine that the second base station resulting in the largest RSRP, except for its own RSRP, is the best interfering base station. When the current transmit power of the second base station is P_2, the first base station adjusts the transmit power of the second base station by a predetermined size (e.g., −10 dB, −9 dB, . . . , +9 dB, +10 dB), calculates an SINR estimate of the first UE, and stores the SINR estimate of the first UE in the memory.

The SINR estimate of the first UE is not a value calculated based on the RSRP of the base station measured by the UE while actually adjusting the transmit power of the second base station, but is an estimate calculated under the assumption that the transmit power of the second base station is varied based on the RSRP of the base station in the first measurement information.

Hence, referring to Equation 1, as the transmit power of the second base station decreases, interference with the first UE lowers, and thus the SINR estimate of the first UE increases. Conversely, as the transmit power of the second base station goes up, interference with the first UE increases, and thus the SINR estimate of the first UE decreases.

Table 1 represents SINR estimates for the first UE between −10 dB and +10 dB when the first base station adjusts the transmit power of the second base station by 1 dB.

TABLE 1

| UE# | Target BS | TxPower −10 dB | TxPower −9 dB | ... | TxPower | ... | TxPower +9 dB | TxPower +10 dB |
|---|---|---|---|---|---|---|---|---|
| UE 1 | BS 2 | 11 dB | 10 dB | ... | 1 dB | ... | −8 dB | −9 dB |

In Table 1 above, the SINR of the first UE in the current transmit power of the second base station means 1 dB, and when the transmit power of the second base station is reduced by 10 dB, the SINR estimate of the first UE is 11 dB, while the SINR estimate of the first UE is −9 dB when the transmit power of the second base station is increased by 10 dB.

In operation 205-2, the second UE 130-2 measures the channel state of the first base station 110-1 and at least one neighbor base station 110-2 or 110-n. The first base station 110-1 may receive second measurement information from the second UE 130-2 in operation 210-2.

For example, the second measurement information may include −113 dBm, −115 dBm, −119 dBm, and −120 dBm, which are the respective RSRPs of signals received from the first base station, which is the serving base station, and the third base station, the fourth base station, and the eighth base station, which are the neighbor base stations.

The first base station may determine that the third base station resulting in the largest RSRP, except for its own RSRP, is the best interfering base station. When the current transmit power of the third base station is P_3, the first base station adjusts the transmit power of the third base station by a predetermined size (e.g., −10 dB, −9 dB, . . . , +9 dB, +10 dB), calculates an SINR estimate of the second UE, and stores the SINR estimate of the second UE.

Table 2 represents Table 1 adding SINR estimates for the second UE between −10 dB and +10 dB when the first base station adjusts the transmit power of the third base station by 1 dB.

TABLE 2

| UE# | Target BS | TxPower −10 dB | TxPower −9 dB | ... | TxPower | ... | TxPower +9 dB | TxPower +10 dB |
|---|---|---|---|---|---|---|---|---|
| UE 1 | BS 2 | 11 dB | 10 dB | ... | 1 dB | ... | −8 dB | −9 dB |
| UE 2 | BS 3 | 4 dB | 3 dB | ... | −6 dB | ... | −15 dB | −16 dB |

In operation 205-3, the nth UE 130-n measures the channel state of the first base station 110-1 and at least one neighbor base station 110-2 or 110-n. The first base station 110-1 may receive nth measurement information from the nth UE 130-n in operation 210-n.

For example, the nth measurement information may include −113 dBm, −115 dBm, −119 dBm, and −120 dBm, which are the respective RSRPs of signals received from the first base station, which is the serving base station, and the second base station, the third base station, and the eighth base station, which are the neighbor base stations.

The first base station may determine that the second base station resulting in the largest RSRP, except for its own RSRP, is the best interfering base station. When the current transmit power of the second base station is P_2, the first base station adjusts the transmit power of the second base station by a predetermined size (e.g., −10 dB, −9 dB, . . . , +9 dB, +10 dB), calculates an SINR estimate of the nth UE, and stores the SINR estimate of the nth UE.

Table 3 represents Table 2 adding SINR estimates for the nth UE between −10 dB and +10 dB when the first base station adjusts the transmit power of the second base station by 1 dB.

TABLE 3

| UE# | Target BS | TxPower −10 dB | TxPower −9 dB | ... | TxPower | ... | TxPower +9 dB | TxPower +10 dB |
|---|---|---|---|---|---|---|---|---|
| UE 1 | BS 2 | 11 dB | 10 dB | ... | 1 dB | ... | −8 dB | −9 dB |
| UE 2 | BS 3 | 4 dB | 3 dB | ... | −6 dB | ... | −15 dB | −16 dB |
| ... | ... | ... | ... | ... | ? | ... | ... | ... |
| UE n | BS 2 | 17 dB | 16 dB | ... | 7 dB | ... | 8 dB | 7 dB |

The first base station 110-1 generates the SINR metric of the first base station by adding, per target base station, the SINR estimates calculated per serving UE and stores the generated SINR metric in the memory (refer to Table 4).

Table 4 represents an example of an SINR metric obtained by adding the SINR estimate of the first UE and the SINR estimate of the nth UE for the second base station.

TABLE 4

| Target BS | TxPower −10 dB | TxPower −9 dB | ... | TxPower | ... | TxPower +9 dB | TxPower +10 dB |
|---|---|---|---|---|---|---|---|
| BS 2 | 11 + 17 dB | 10 + 16 dB | ... | 1 + 7 dB | ... | −8 + 8 dB | −9 + 7 dB |
| BS 3 | 4 dB | 3 dB | ... | −6 dB | ... | −15 dB | −16 dB |

When the first base station sends the SINR estimates for all the serving UEs, as they are, to the neighbor base station, transmission and reception load may increase. Thus, reducing the amount of information transmitted and received between the first base station and the neighbor base stations is required.

According to an embodiment of the disclosure, the first base station may transmit the SINR estimate of the serving UE for the neighbor base station with the largest RSSI to the neighbor base station with the largest RSSI. In other words, there may be one best interfering base station per serving UE, and only information corresponding to the number of serving UEs may be transmitted by sending the SINR estimate of the serving UE only to the best interfering base station. Thus, transmission and reception loads may decrease. For example, referring to Table 3, the first base station may send the SINR estimate of the first UE for the second base station and the SINR estimate of the nth UE for the second base station to the second base station.

According to an embodiment of the disclosure, to reduce transmission and reception loads among base stations, the first base station may transmit the sum or mean of SINR estimates of serving UEs for particular neighbor base stations to the particular neighbor base stations. Since the particular neighbor base stations are largely the base stations mostly interfering with the first cell of the first base station, the number of the particular neighbor base stations would significantly decrease. For example, referring to Table 4, the first base station may send the sum or mean of the SINR estimate of the first UE and the SINR estimate of the nth UE for the second base station to the first base station.

The sum or mean of the SINR estimates of UEs for a particular neighbor base station means the SINR metric for the particular neighbor base station.

However, the mean of the SINR estimates of serving UEs for a particular neighbor base station, unlike the sum, cannot give quantitative information about the number of the serving UEs receiving interference by the neighbor base station. Thus, the number of the serving UEs alongside the mean of the SINR estimates of the serving UEs, may be delivered to the neighbor base station.

The first base station 110-1 receives the first information containing the information regarding the SINR estimates of the serving UEs in the neighbor base station from the neighbor base station in operations 220-2, . . . , 220-n.

The information regarding the SINR estimates of the serving UEs in the neighbor base station, i.e., information regarding the SINR metric of the neighbor base station, is transmitted from the neighbor base station through the first information to the first base station.

The SINR metric of the neighbor base station means the sum of SINR estimates related to the first base station among the SINR estimates of the serving UEs in the neighbor cell when the neighbor base station varies the transmit power of the first base station by a predetermined magnitude. As related, the method by which the first base station calculates the SINR metric has been described above.

Referring back to Equation 3, the sum of the SINR estimates of serving UEs in the neighbor base station as per the variation in the transmit power of the first base station, as calculated by the jth neighbor base station, has been represented as SINR neighbor_metric(j,p), and the sum of the SINR metrics of a plurality of neighbor base stations has been represented as $$\sum_{j \in NeighborCell} \text{neighbor\_metric}(j, p).$$

Referring to Equation 3, the first base station determines its transmit power at which the total sum of the $$SINRs\left(\sum_{m \in ConnectedUE} SINR\_dB(m, p)\right)$$

of the plurality of serving UEs in the serving cell and the SINR metrics $$\left(\sum_{j \in NeighborCell} \text{neighbor\_metric}(j, p)\right)$$

of the plurality of neighbor base stations is maximized. In other words, the first base station may determine its transmit power to give the maximum SINR by summating the SINR metric of the neighbor base station, which has determined it as the best interfering base station and its own SINR.

The first base station may adjust the lower limit of transmit power to ensure the coverage of the serving UE connected to the serving cell despite adjustment of transmit power. Thus, albeit adjusting the transmit power to decrease, the first base station may keep the transmit power equal to or higher than the lower limit of transmit power, thus preventing the serving UE from losing connection.

In operation 222, the first base station may determine and adjust the lower limit of transmit power based on measurement information by UE.

The first base station receives measurement information from the mth UE ($UE_m$). The base station calculates UEm's received SINR ($SINR\_dB$ in Equation 4) at the current transmit power using the measurement information and calculates a transmit power ($TxPower_{LowerLimit}$ in Equation 5), which may be as low as possible while still ensuring the coverage of $UE_m$, using the calculated SINR.

$$\text{SINR\_dB}_m = \qquad\qquad\qquad\qquad\qquad\text{Equation 4}$$
$$10*\log10\left(\frac{\text{RSRP\_serving}}{\sum_j(\text{RSRP}_j\_\text{neighbor}*loading_j)+NI_m}\right)$$

In Equation 4, SINR_dBm is the signal (received by UEm in the serving cell)-to-interference-plus-noise (by the neighbor base stations) ratio. RSRP_serving is the RSRP (mW) of serving cell delivered by UEm, RSRP$_j$_neighbor is the RSRP (mW) of neighbor cell delivered by UEm, loading$_j$ is the PRB loading of neighbor cell j (received from the neighbor base station at each cycle), and NI$_m$ is the estimated interference-and-noise to UEm (mW).

$$\text{TxPower}_{SINR,m} = \text{TxPower}_{current} + (\text{SINR}_{threshold} - \text{SINR\_dB}_m) \qquad\text{Equation 5}$$

In Equation 5, SINR$_{threshold}$ is the minimum SINR (dB) to ensure the coverage of serving UE, SINR_dBm is the signal (received by UEm in the serving cell)-to-interference-plus-noise (by the neighbor base stations) ratio, TxPower$_{current}$ is the current transmit power (dB) of the base station, and TxPower$_{SINR,m}$ is the lower limit of reference transmit power for ensuring the coverage of UEm.

SINR$_{threshold}$ may previously be set. Alternatively, SINR$_{threshold}$ may be determined by the serving base station given at least one of the UE's measurement information and the number of serving UEs that the serving base station may serve.

$$\text{TxPower}_{LowerLimit} = \text{MIN}[\text{TxPower}_{UpperLimit}, \text{MAX}(\text{TxPower}_{LowerLimit}, \text{TxPower}_{SINR,m})] \qquad\text{Equation 6}$$

In Equation 6, the right term, TxPower$_{LowerLimit}$, is the lower limit (dBm) of transmit power initially or current set, which may initially be set to any value (e.g., 0). TxPower$_{UpperLimit}$ is the upper limit of transmit power (dBm). The serving base station may calculate the lower limits of reference transmit power (TxPower_SINR,m) for all the serving UEs, as shown in Equation 5, and determine that the largest of the transmit power lower limits (TxPower_SINR, m) for the serving UEs is the lower limit of (TxPower$_{LowerLimit}$) of the transmit power of the serving base station. However, it should be noted that the determined transmit power lower limit (TxPower$_{LowerLimit}$) should be not more than the transmit power upper limit (TxPowerUpperLimit).

The method by which the first base station determines the lower limit of transmit power using the measurement report has been described above. Alternatively, the first base station may determine and adjust its transmit power lower limit using handover (HO) statistics and call drop statistics gathered for a predetermined time.

The first base station calculates an HO success rate and a call drop rate at the current transmit power using the HO statistics and call drop statistics and compares them with a preset target HO success rate and target call drop rate, thereby determining the deterioration of network quality.

Upon meeting at least one of the conditions that the HO success rate is smaller than the target HO success rate (HO success rate<target HO success rate) or that the call drop rate is larger than the target call drop rate (call drop rate>target call drop rate), the first base station determines that the network quality has been deteriorated by the first base station.

Hence, upon determining the deterioration of network quality, the first base station may bring its transmit power lower limit up, raising the HO success rate while lowering the call drop rate.

Selectively, the first base station may fulfill a method for bringing its transmit power lower limit up When the first base station has yet to adjust its transmit power lower limit for a predetermined time, either by adjusting the transmit power lower limit based on measurement information or by adjusting the transmit power lower limit based on statistics, the first base station adjusts the transmit power lower limit to lower. By doing so, the transmit power of the base station may be further lowered, saving the surface power consumption and reducing interference with the neighbor cells.

Selectively, the first base station may adjust its transmit power upper limit in operation 224.

The first base station is better off using high transmit power to ensure coverage for the UE. However, the first base station's high transmit power may cause an excess overlap between the serving cell and the neighbor cell of the neighbor base station, significantly interfering with the neighbor cell. Thus, an upper limit may be imposed on the transmit power of the first base station, thus preventing the transmit power of the first base station from going up excessively.

Each base station may send a request for imposing an upper limit on transmit power (i.e., reduce the transmit power) to another base station whose cell excessively overlaps the cell of the requesting base station. The base station receiving the request may reduce its transmit power.

For example, the first base station may determine that the third largest interfering neighbor base station is the best interfering base station using the measurement information received from the serving UE, calculate how much the third largest base station should reduce its transmit power to avoid the occurrence of an excessive overlap, and deliver the information of the calculation to the neighbor base stations at each inter-base station information exchange cycle.

The reason why the first base station sends the transmit power upper limit request to the third largest interfering base station is because the serving UE may hand over to the largest interfering neighbor base station or the second largest interfering neighbor base station. Thus, the first base station may abstain from sending the transmit power upper limit request to the two high-RSSI (for the serving UE) neighbor base stations. However, embodiments of the disclosure are not limited thereto. For example, the first base station may send a request for posing an upper limit of transmit power to the largest, or second largest, interfering base station.

For example, the first base station receives measurement information indicating the channel state from the serving UE. The measurement information may include −100 dBm, −103 dBm, −105 dBm, −108 dBm, and −109 dBm, which are the respective RSRPs of signals received from the first base station, which is the serving base station, and the second base station, the fourth base station, the sixth base station, and the eighth base station, which are the neighbor base stations.

The serving base station, i.e., the first base station, may send a request for reducing transmit power upper limit to the third largest interfering neighbor base station, i.e., the sixth base station, and its next largest interfering neighbor base stations, namely, the eighth base station, among the interfering neighbor base stations, so as to present a predetermined difference from the serving base station's RSRP.

Table 5 represents an example in which the predetermined difference is 10 dB. Since the serving cell's RSRP is −100 dBm, the first base station sends a request of −2 dB to the sixth base station, and a request of −1 dB to the eighth base station, so that the RSRPs of the sixth base station and the eighth base station are adjusted to −110 dBm. Receiving the request, the sixth and eighth base stations may reduce their transmit power upper limits by reflecting −2 dB and −1 dB, respectively.

TABLE 5

| Serving cell | Neighbor cell | Transmit power upper limit as requested to be adjusted |
|---|---|---|
| Cell 1 | Cell 6 | −110 − (−108) = −2 dB |
|  | Cell 8 | −110 − (−109) = −1 dB |

Conversely, the first base station may receive a request for adjusting its transmit power upper limit from a neighbor base station.

Upon receiving requests for adjusting transmit power upper limit from a plurality of neighbor base stations, the serving base station reduces its transmit power upper limit down to the minimum value among the requested upper limits. However, the adjusted transmit power upper limit should be larger than the transmit power lower limit.

For example, when the serving base station, i.e., the first base station, receives requests for adjusting transmit power upper limit from neighbor base stations, e.g., the second base station and the third base station as shown in Table 6, the first base station reflects the value requested by the second base station to minimize its transmit power upper limit. In other words, the first base station adjusts its transmit power upper limit so that its RSRP becomes −100 dB−3 dB=−103 dB. The transmit power upper limit of the first base station is reduced by −3 dB from the current upper limit.

TABLE 6

| Neighbor cell | Serving cell | Transmit power upper limit as requested to be adjusted |
|---|---|---|
| Cell 3 | Cell 1 | −2 dB |
| Cell 2 | Cell 1 | −3 dB |

Selectively, upon failing to receive a request for adjusting transmit power upper limit during a predetermined time, the first base station may raise its transmit power upper limit.

Figure 3:
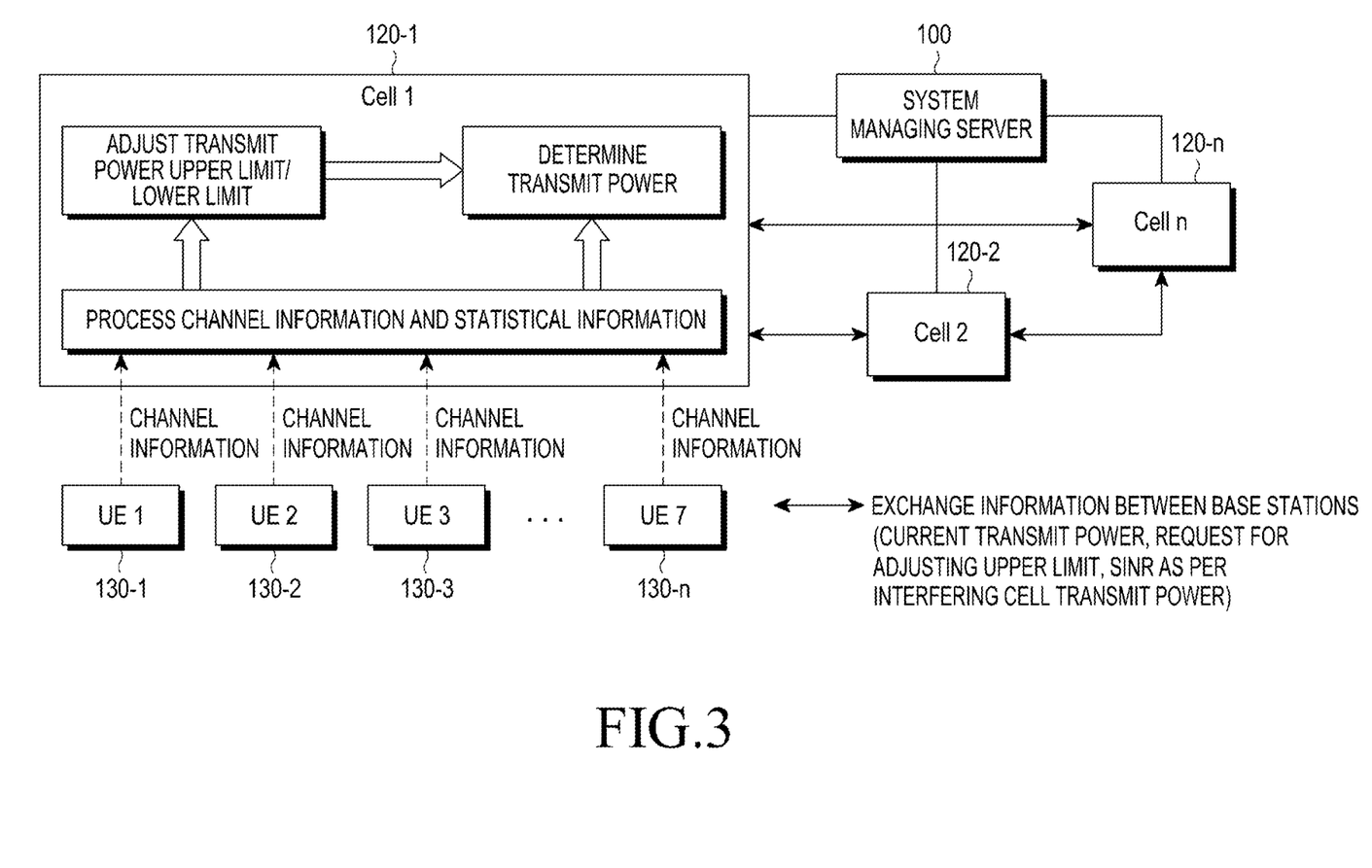
FIG. 3 is a block diagram illustrating a method for adjusting transmit power according to an embodiment of the disclosure.

FIG. 3 is a block diagram illustrating a method for adjusting transmit power according to an embodiment of the disclosure.

Described with reference to FIG. 3 is a method for determining transmit power in a real-time, distributive manner to adjust inter-cell interference in an inter-cell interference environment.

Referring to FIG. 3, UEs 130-1, . . . , 130-n are serving UEs for cell1 120-1, cell1 is the cell to determine transmit power, and cell2 and celln are neighbor cells interfering with cell1. The UE receives data from cell1, measures RSSIs for cell1, cell2, and celln, and delivers the RSSIs to cell1. Described below are operations performed by cell1 to adjust transmit power.

A system managing server 100 transfers information necessary for determining transmit power to each cell. The information necessary for determining transmit power includes an adjustment range and adjustment cycle of transmit power, neighbor cell-related information, and inter-neighbor cell information exchange cycle. However, since the information necessary for determining transmit power may be exchanged between base stations, the system managing server is not an essential component.

Cell1 receives measurement information containing a measurement report (MR) of the serving UE in the cell. The MR includes measurement information about the serving cell and interfering cells.

Cell1 adjusts the transmit power lower limit using the received measurement information and determines upper limits to be requested for the neighbor cells' (cell2's and cell3's) transmit power. Cell1 gathers network quality statistics (HO statistics and call drop statistics), and when the network quality deteriorates, adjusts the transmit power lower limit.

When cell1 varies the transmit power of interfering cells (cell2 and cell3) using the measurement information received from UE, cell1 estimates (calculates) the received SINR metric of UE in cell1.

At each inter-neighbor cell information exchange cycle, cell1 transfers the transmit power upper limits to be requested for the neighbor cells (cell2 and cell3), the received SINR metric of the UE in cell1, the current transmit power of cell1, and the loading of cell1 to the neighbor cells.

Conversely, at each inter-neighbor cell information exchange cycle, cell1 receives, from the neighbor cells, the transmit power upper limit to be requested for cell1, received SINR metrics of UEs in the neighbor cells, the current transmit power of the neighbor cells, and the loading of the neighbor cells.

At each transmit power determination cycle, cell1 adjusts its transmit power upper limit using the transmit power upper limits received from the neighbor cells (cell2 and cell3).

At each transmit power determination cycle, cell1 determines its transmit power using the SINR metrics of the neighbor cells (cell2 and cell3) as per the transmit power of cell1 received from the neighbor cells and the SINR metric of serving UE in cell1. Cell1 determines its transmit power using the received SINR metric in UE in cell1 and the received SINR metrics of UEs in the neighbor cells so that the sum of SINRs related to cell1 is maximized. At this time, the transmit power is a value between the transmit power lower limit and upper limit determined.

Cell1 applies the determined transmit power and transfers the applied transmit power in a control message to the serving UE. The above-described transmit power adjusting process is repeated at each transmit power determination cycle. The transmit power determination cycle may be set to be equal to or shorter than the inter-neighbor cell information exchange cycle so that the cell transmit power can be adjusted in real-time.

Figure 4:
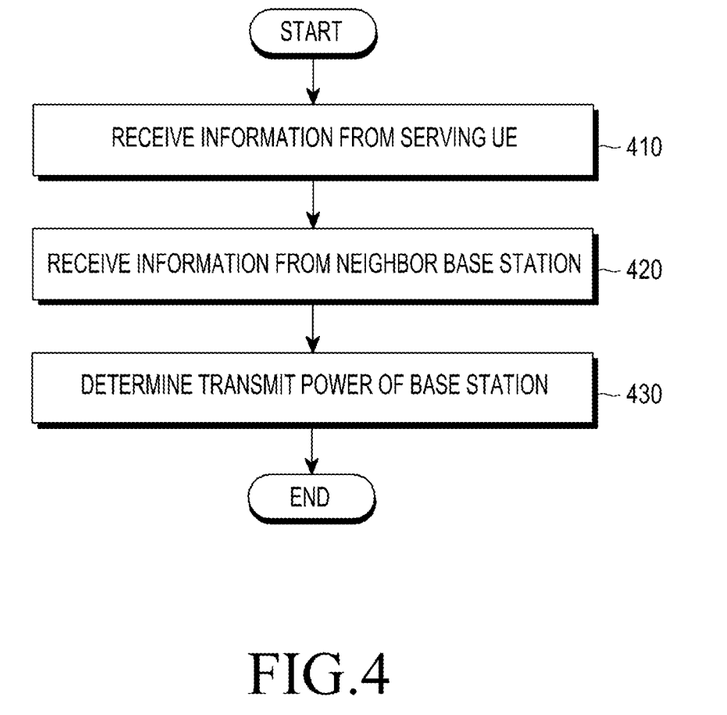
FIG. 4 is a flowchart illustrating a method for adjusting transmit power of a base station according to an embodiment of the disclosure.

FIG. 4 is a flowchart illustrating a method for adjusting transmit power of a base station according to an embodiment of the disclosure.

Referring to FIG. 4, according to an embodiment of the disclosure, a method for adjusting transmit power of a serving base station may comprise receiving measurement information indicating the channel states of the serving base station and at least one neighbor base station from at least one serving UE at operation 410, receiving first information including information about transmit power of the at least one neighbor base station from the at least one neighbor base station at operation 420, and determining the transmit power of the serving base station using the measurement information and the first information at operation 430.

Determining the transmit power of the serving base station at operation 430 may include determining a received SINR of the at least one serving UE using the measurement information and the first information and determining the transmit power of the serving base station using the first information and the SINR of the at least one serving UE.

The first information may include information about an SINR related to the at least one neighbor base station.

The transmit power of the serving base station may be determined to maximize the sum of an SINR of the at least one serving UE and an SINR related to the at least one neighbor base station.

According to an embodiment of the disclosure, the method may further comprise transmitting second information including information related to the SINR of the at least one serving UE and information about the transmit power of the serving base station to the at least one neighbor base station.

Information related to the SINR of the at least one serving UE may include one of information about respective SINRs of the at least one serving UE, information about the sum of the respective SINRs of the at least one serving UE, information about the mean of the respective SINRs of the at least one serving UE, or information about the number of the at least one serving UE.

The first information may be received from the at least one neighbor base station at a first predetermined cycle, and wherein the transmit power of the serving base station, e.g., the first base station, is determined at a second predetermined cycle equal to or shorter than the first predetermined cycle. The first predetermined cycle means the inter-neighbor cell information exchange cycle. The second predetermined cycle means the transmit power determination cycle.

Figure 5:
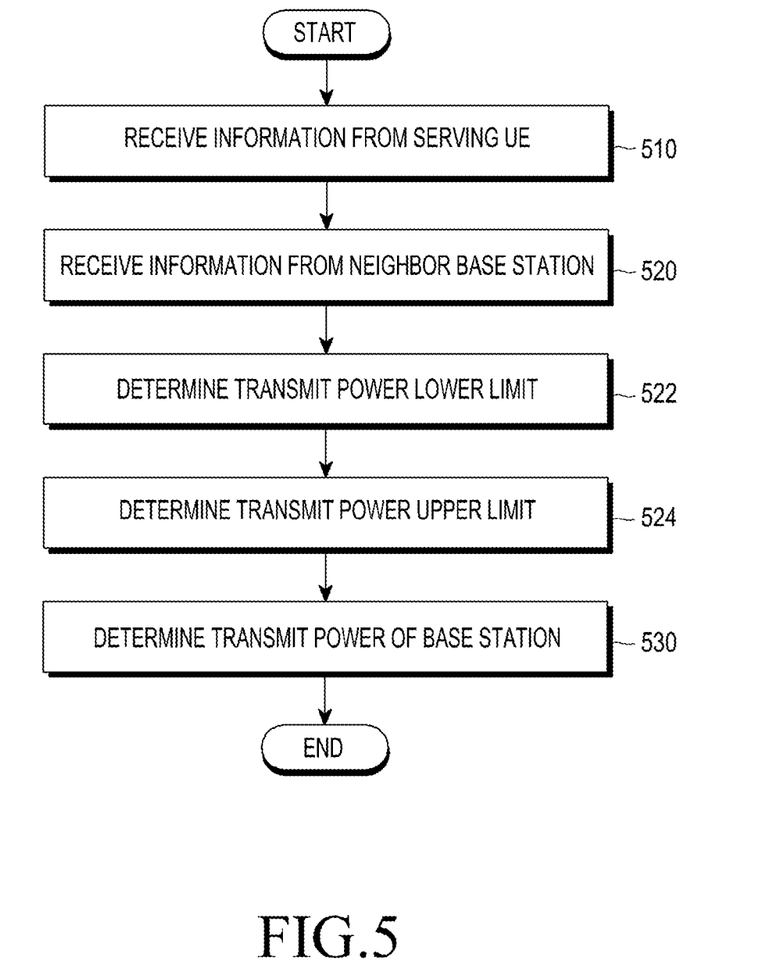
FIG. 5 is a flowchart illustrating a method for determining a lower limit and upper limit of transmit power upon adjusting transmit power of a base station according to an embodiment of the disclosure.

FIG. 5 is a flowchart illustrating a method for determining lower limit and upper limit of transmit power upon adjusting the transmit power of a base station according to an embodiment of the disclosure.

Referring to FIG. 5, according to an embodiment of the disclosure, the base station may receive information from a serving UE in operation 510. In operation 520, the base station may receive information from a neighbor base station. The method of adjusting the transmit power of the serving base station in the wireless communication system may further comprise adjusting the lower limit of the transmit power of the serving base station using the measurement information and the first information at operation 522.

Adjusting the lower limit of the transmit power of the serving base station using the measurement information and the first information at operation 522 may include calculating the SINR of the at least one serving UE using the measurement information and the first information and adjusting the lower limit of the transmit power of the serving base station by comparing the calculated SINR with a preset value.

The preset value is a minimum RSSI for coverage of the at least one serving UE.

Adjusting the lower limit of the transmit power of the serving base station using the measurement information and the first information may include calculating the SINR of the at least one serving UE using the measurement information and the first information and adjusting the lower limit of the transmit power of the serving base station using a maximum SINR of respective SINRs of the at least one serving UE.

Adjusting the lower limit of the transmit power of the serving base station using the measurement information and the first information may include reducing the lower limit of the transmit power of the serving base station when the lower limit of the transmit power of the serving base station is not increased for a predetermined time.

According to an embodiment of the disclosure, the method may further comprise adjusting the lower limit of the transmit power of the serving base station considering at least one of a handover success rate or a call drop rate gathered for the serving base station for a predetermined time.

Referring to FIG. 5, according to an embodiment of the disclosure, the method of adjusting the transmit power of the serving base station in the wireless communication system may further comprise adjusting the upper limit of the transmit power of the serving base station at operation 524. In operation 530, the transmit power of the base station may be determined.

Adjusting the upper limit of the transmit power of the serving base station may include receiving third information regarding a request for adjusting the upper limit of the transmit power of the serving base station from the at least one neighbor base station and adjusting the upper limit of the transmit power of the serving base station using the third information.

The third information is information transmitted from at least one neighbor base station to the serving base station at the inter-neighbor cell information exchange period.

Upon receiving requests for adjusting the upper limit of the transmit power from a plurality of neighbor base stations, values requested are reflected in order to minimize the upper limit of the transmit power of the serving base station.

The serving base station may determine rankings as to how much the at least one neighbor base station causes interference using the measurement information and transmit information about a request for adjusting the upper limit of the transmit power of each of remaining neighbor base stations except the one or two neighbor base stations causing largest interference among the at least one neighbor base station to the remaining neighbor base stations.

The transmit power of the remaining neighbor base stations is adjusted to be different by a predetermined value or more from the transmit power of the serving base station.

The serving base station may adjust the upper limit of the transmit power of the serving base station, e.g., the first base station, upon failing to receive, from one or more third base stations, information regarding a request for adjusting the upper limit of the transmit power of the serving base station, e.g., the first base station, for a predetermined time.

According to an embodiment of the disclosure, the method may further comprise applying the determined transmit power of the serving base station and transmitting the determined transmit power of the serving base station in a control message to the at least one serving UE.

Figure 6:
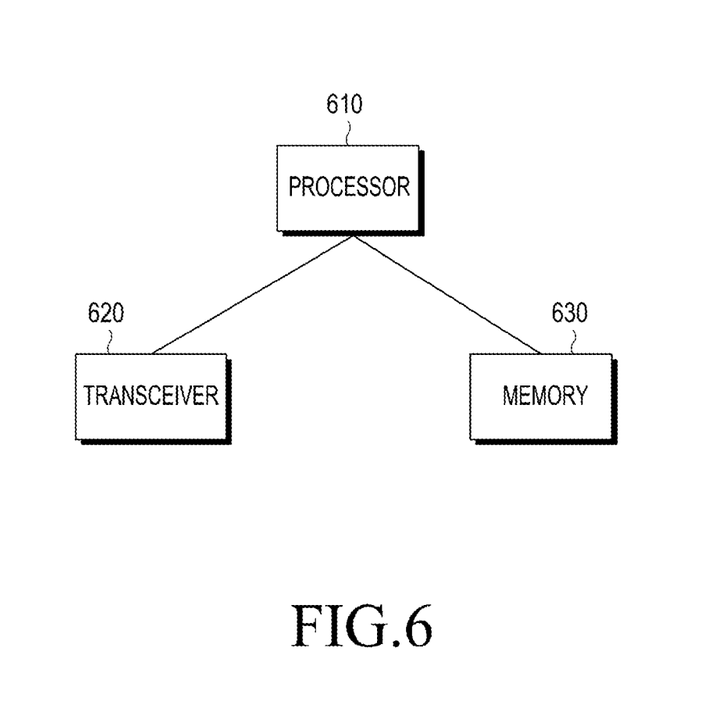
FIG. 6 is a view illustrating a configuration of a base station according to an embodiment of the disclosure.

FIG. 6 is a view illustrating a configuration of a base station according to an embodiment of the disclosure.

Referring to FIG. 6, the base station may be a serving base station or a neighbor base station. The base station includes a processor 610, a transceiver 620, and a memory 630. The transceiver 620 may include a transmitting module and a receiving module to transmit or receive information or signals to/from a UE or other base stations. The memory 630 may store information received through the transceiver 620 or information to be sent through the transceiver 620 and information computed by the processor 610. The processor 610 may process computation on information transmitted or received through the transceiver, control the memory 630 to store or read out computed data, and control the transceiver 620 to transmit or receive data. The processor 610 may control the memory 630 or the transceiver 620 to perform the methods of adjusting the transmit power of a base station as described above in connection with FIGS. 1 to 5, or the processor 610 may perform computation on its own.

It should be noted that FIGS. 1 to 6 are not intended as limiting the scope of the disclosure. In other words, all the components or operations illustrated in FIGS. 1 to 6 should not be construed as essential ones, and only some of the components may be included without harming the essence of the disclosure.

As is apparent from the foregoing description, embodiments of the disclosure may adjust transmit power in a real-time, distributive manner to enhance the SINR of a UE in an inter-cell interference environment.

Embodiments of the disclosure may adjust the transmit power of a cell in a real-time, distributive manner to adjust inter-cell interference in an inter-cell interference environment.

Embodiments of the disclosure may detect the deterioration of network quality due to transmit power adjustment by monitoring network quality based on network statistics and update the transmit power adjustment range.

Embodiments of the disclosure may predict the SINR due to a variation in transmit power and update the transmit power adjustment range to prevent the SINR of UE from lowering below the SINR at which communication outage occurs.

Embodiments of the disclosure may recognize the occurrence of an excessive cell overlapping area and pose an upper limit on transmit power to remove such excessive overlapping area.

Embodiments of the disclosure may determine per-cell transmit power in a real-time, distributive manner in each cell without network quality deterioration in an inter-cell interference environment.

Embodiments of the disclosure allow each base station to distributively determine transmit power without the need for a separate entity (e.g., an optimizing server) and enhance the SINR and throughput of a UE.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A serving base station configured to transmit power of the serving base station in a wireless communication system, the serving base station comprising:
   a transceiver; and
   a processor configured to control the transceiver, wherein the processor is configured to:
      obtain measurement information indicating channel states of the serving base station and at least one neighbor base station from at least one serving user equipment (UE) via the transceiver,
      obtain first information including information about transmit power of the at least one neighbor base station from the at least one neighbor base station,
      identify information related to a signal-to-interference-plus-noise ratio (SINR) of the at least one serving UE using the measurement information and the first information, and
      identify the transmit power of the serving base station using the measurement information, the first information, and the information related to the SINR of the at least one serving UE,
   wherein the information related to the SINR of the at least one serving UE comprises one of information about respective SINRs of the at least one serving UE, information about a sum of the respective SINRs of the at least one serving UE, or information about a mean of the respective SINRs of the at least one serving UE.

2. The serving base station of claim 1, wherein the first information comprises information about an SINR related to the at least one neighbor base station.

3. The serving base station of claim 1, wherein the transmit power of the serving base station is determined to maximize a sum of the SINR of the at least one serving UE and an SINR related to the at least one neighbor base station.

4. The serving base station of claim 1, wherein the processor is further configured to transmit second information including the information related to the SINR of the at least one serving UE and information about the transmit power of the serving base station to the at least one neighbor base station.

5. The serving base station of claim 1,
   wherein the first information is received from the at least one neighbor base station at a first predetermined cycle, and
   wherein the transmit power of the serving base station is determined at a second predetermined cycle equal to or shorter than the first predetermined cycle.

6. The serving base station of claim 1, wherein the processor is further configured to adjust a lower limit of the transmit power of the serving base station based on a comparison of the SINR and a preset value.

7. The serving base station of claim 6, wherein the preset value comprises a minimum received signal strength indication (RSSI) for coverage of the at least one serving UE.

8. A serving base station configured to adjust transmit power of the serving base station in a wireless communication system, the serving base station comprising:
   a transceiver; and
   a processor configured to control the transceiver, wherein the processor is configured to:
      obtain measurement information indicating channel states of the serving base station and at least one neighbor base station from at least one serving user equipment (UE) via the transceiver,
      obtain first information including information about transmit power of the at least one neighbor base station from the at least one neighbor base station,
      identify the transmit power of the serving base station using the measurement information and the first information,
      receive third information regarding a request for adjusting an upper limit of the transmit power of the serving base station from the at least one neighbor base station, and
      adjust the upper limit of the transmit power of the serving base station using the third information.

9. The serving base station of claim 8, wherein, upon receiving requests for adjusting the upper limit of the transmit power from a plurality of neighbor base stations, values requested are reflected to minimize the upper limit of the transmit power of the serving base station.

10. The serving base station of claim 8, wherein the processor is further configured to:
   identify how much the at least one neighbor base station causes interference using the measurement information, and
   transmit information about a request for adjusting an upper limit of the transmit power of each of remaining neighbor base stations except one or two neighbor base stations causing largest interference among the at least one neighbor base station to the remaining neighbor base stations.

11. The serving base station of claim 10, wherein the transmit power of the remaining neighbor base stations is adjusted to be different by a predetermined value or more from the transmit power of the serving base station.

12. The serving base station of claim 8, wherein the processor is further configured to:
   transmit the transmit power of the serving base station in a control message to the at least one serving UE.

13. A serving base station configured to adjust transmit power of the serving base station in a wireless communication system, the serving base station comprising:
   a transceiver; and
   a processor configured to control the transceiver, wherein the processor is configured to:
      receive measurement information indicating channel states of the serving base station and at least one neighbor base station from at least one user equipment (UE) served via the transceiver,
      receive, from the at least one neighbor base station, first information including information about transmit power of the at least one neighbor base station and information about estimated signal-to-interference-plus-noise ratios (SINRs) related to at least one UE served by the at least one neighbor base station for a plurality of variations in the transmit power of the serving base station,
      determine a received SINR of the at least one UE served by the serving base station using the measurement information,
      determine the transmit power of the serving base station using the received SINR of the at least one UE served by the serving base station and the information about the estimated SINRs related to the at least one UE served by the at least one neighbor base station,
      estimate, based on the information about the transmit power of the at least one neighbor base station and the measurement information, SINRs related to the at least one UE served by the serving base station for a plurality of variations in the transmit power of the at least one neighbor base station, and
      transmit second information including the estimated SINRs related the at least one UE served by the serving base station and information about the transmit power of the serving base station to one or more of the at least one neighbor base station.

14. The serving base station of claim 13,
   wherein the first information is received from the at least one neighbor base station at a first predetermined cycle, and
   wherein the transmit power of the serving base station is determined at a second predetermined cycle equal to or shorter than the first predetermined cycle.

15. The serving base station of claim 13, wherein the processor is further configured to adjust a lower limit of the transmit power of the serving base station based on a comparison of the received SINR and a preset value.

16. The serving base station of claim 15, wherein the preset value comprises a minimum received signal strength indication (RSSI) for coverage of the at least one serving UE.

17. The serving base station of claim 13, wherein the processor is further configured to:
   receive third information regarding a request for adjusting an upper limit of the transmit power of the serving base station from the at least one neighbor base station, and
   adjust the upper limit of the transmit power of the serving base station using the third information.

* * * * *